United States Patent [19]

Slocum et al.

[11] Patent Number: 5,799,924
[45] Date of Patent: Sep. 1, 1998

[54] REPLICATED-IN-PLACE INTERNAL VISCOUS SHEAR DAMPER FOR MACHINE STRUCTURES AND COMPONENTS

[75] Inventors: Alexander H. Slocum, Concord, N.H.; Eric R. Marsh; Douglas H. Smith, both of Naperville, Ill.

[73] Assignee: AESOP, Inc., Concord, N.H.

[21] Appl. No.: 406,253

[22] Filed: Mar. 13, 1995

Related U.S. Application Data

[63] Continuation of Ser. No. 942,262, Sep. 9, 1992, abandoned.

[51] Int. Cl.$^6$ ............................................. F16M 13/00
[52] U.S. Cl. ........................... 248/636; 52/167 R; 52/720; 52/727; 52/730.1
[58] Field of Search ........................... 248/636, 621, 248/632, 633, 634; 52/167 R, 167 DF, 167 CB, 720, 727, 731.1, 731.2, 730.1

[56] References Cited

U.S. PATENT DOCUMENTS

| 997,493 | 7/1911 | Gallagher | 52/727 |
|---|---|---|---|
| 1,230,475 | 6/1917 | Gardner | 52/727 |
| 2,126,622 | 8/1938 | Davis | 52/727 X |
| 2,239,319 | 4/1941 | Halford et al. | 248/634 |
| 3,088,561 | 5/1963 | Ruzicka | 52/727 |
| 3,691,712 | 9/1972 | Bowling et al. | 52/393 |
| 3,727,936 | 4/1973 | Klir et al. | 52/727 X |
| 4,312,162 | 1/1982 | Medney | 52/727 X |
| 4,347,019 | 8/1982 | Metz | 52/727 |
| 4,436,274 | 3/1984 | Kramer | 248/633 |
| 4,512,616 | 4/1985 | Suzuki et al. | 308/3 |
| 4,727,695 | 3/1988 | Kemeney et al. | 248/634 X |
| 4,865,299 | 9/1989 | Goto | 248/636 X |
| 4,913,410 | 4/1990 | Marshall | 248/634 X |
| 4,939,878 | 7/1990 | Shuhbauer | 52/169.14 |
| 5,156,379 | 10/1992 | Tabata | 248/636 X |
| 5,308,675 | 5/1994 | Crane et al. | 248/634 X |

FOREIGN PATENT DOCUMENTS 2194182  2/1988  United Kingdom.

OTHER PUBLICATIONS

"Tetrahedron Allows Machining to Angstroms," *Eureka*, v. 7, No. 11, pp. 3, 26–27 (Nov. 1987).
"Tetraform 1—a nanoprecision machine tool concept."
S. Haranath, N. Ganesan, and B. Rao, "Dynamic Analysis of Machine Tool Structures with Applied Damping Treatment," *Int. J. Mach. Tools. Manuf.* vol. 27, No. 1, 1987, pp. 43–55.

*Primary Examiner*—Leslie A. Braun
*Assistant Examiner*—Anita King
*Attorney, Agent, or Firm*—Rines and Rines

[57] ABSTRACT

A novel means for providing an internal damping mechanism for a system with structural load supporting members that may be subject to time-varying loads, where the structure's structural members have rough holes formed in them, either by casting, drilling, or welding pipe, where the holes can be any shape, but the ideal shape and location maximizes the product of the perimeter of the shape and the distance from the neutral axes to the neutral axis of the structure, so a smooth surfaced shear member, with a diameter several millimeters smaller than the hole and a surface finish on the order of 0.5 micron $R_a$, with its surfaced covered with a very viscous fluid, can be inserted into the hole so a replicant, such as epoxy or rubber, can be injected around the shear member, such that when the structure bends, shear strains occur between the structure and the shear members and this strain occurs across the viscous fluid interface which is very thin because of the use of the replicant, so therefore the energy dissipation rate will be high and bending and axial vibrations will be damped, said damping system being referred to as a replicated-in-place shear damper.

33 Claims, 5 Drawing Sheets

REPLICATED-IN-PLACE INTERNAL VISCOUS SHEAR DAMPER FOR MACHINE STRUCTURES AND COMPONENTS

This application is a continuation of Ser. No. 07/942,262, filed Sep. 9, 1992, now abandoned.

The present invention relates to means to damp vibrations in machines and structures. More specifically, the invention is concerned with a system that includes a structure that has longitudinal holes cast, drilled, formed, or attached (in the form of tubes) in it. The holes can be any shape, but the ideal shape maximizes the perimeter (e.g., a square). The holes should be as large as possible and their neutral axes must be as far away as possible from the neutral axis of the structure. Ideally, the holes almost fill the structure (e.g., four squares inside of a large square. A smooth surfaced structural shear member, such as a tube, plate, solid section, that is 3–5 mm smaller than the hole is covered with a very viscous fluid (e.g., vacuum grease). The surface is gently wiped with a rag so only a thin film of viscous mold release is left. Optionally, the ends of the shear member should have lubricated O rings on them to prevent a Newtonian fluid from leaking with time. The shear member is suspended into the hole, and an epoxy or hard rubber is injected around the shear member to act as a replicant. After the replicant hardens, a press is used to free the shear member from the replicant. When the procedure has been done properly, the shear member will be held only by viscous friction resistance. Since the neutral axes of the shear members are displaced from the neutral axis of the structure, bending of the structure causes relative shear to occur between the surfaces of the shear members and the structure. This shearing motion shears the viscous fluid and dissipates vibration energy at a rate orders of magnitude higher than would normally occur in the material of the structure or in its joints. This concept allows machine tool builders to design a machine with integral rough cast longitudinal holes which can have replicated shear member dampers installed if the customer requests a high damping option on the machine order form. Thus the concept facilitates modular construction of machine tools.

BACKGROUND

The response of a structure to a time-varying input depends on the stiffness, damping, and mass of a structure. Hence good stiffness and damping are each necessary, but not individually sufficient, requirements for a precision machine. The structural joints in a machine tool have long been known to be a source of damping by the mechanisms of friction and microslip. A study of structural joint damping has shown that numerous theories are available for predicting damping by these mechanisms; however, the amount of damping obtained is still orders of magnitude less than what is required for critical damping, and controlling the surface interface parameters at the joint to achieve uniform results from machine to machine is difficult. In addition, as far as the accuracy of the machine is required, it would be best if the joints behaved as a rigid interface. In general, damping should be obtained by proper selection of materials and damping mechanisms.

Machine tools traditionally have been built of cast iron, which has moderately good damping properties. When more damping was required for machines that made heavy cuts or were subject to high-frequency vibration (e.g., grinders), the structure's cavities were sometimes filled with lead shot or sand for viscous and mass damping (the particles would rub against each other) or concrete for mass damping. Polymer concretes (aggregates bonded together with epoxy) were then developed, and they typically had on the order of 3–10 times the damping capacity of cast iron and were easier to cast. Polymer concretes are now commonly used for machines subject to high levels of vibration (e.g., grinders). Damping masses (e.g., tuned mass dampers) have also been implemented in precision surface grinding applications to vary the dynamic characteristics of the machine and suppress unwanted vibrations of the wheel head. However, as higher speeds and greater accuracies are sought, even better means to damp vibration will be required.

Various systems have been developed for the purpose of adding damping in structures, including: 1) tuned mass dampers, 2) shear plate dampers, and 3) the Tetraform concept for machine structures (UK patent 8,719,169).

The amplification at a particular frequency can be minimized with the use of a tuned mass damper. In a machine with a rotating component (e.g., a grinding wheel), there is often enough energy at multiples of the rotational frequency (harmonics) to cause resonant vibrations in some of the machine's components. This often occurs in cantilevered components such as boring bars and some grinding wheel dressers. A tuned mass damper is simply a mass, spring, and damper attached to a structure at the point where vibration amplitude is to be decreased. The size of the mass, spring, and damper are chosen so they oscillate out of phase with the structure and thus help to reduce the structure's vibration amplitude. The design of tuned mass dampers is relatively straightforward and they have been used with great success in many different types of structures (e.g., the John Hancock Building in Boston and numerous offshore oil platforms). Since a structure has an infinite number of modes of vibration, tuned mass dampers are used primarily to prevent vibration when a machine has a primary vibration mode which is often excited and is performance degrading. Part weight, machine axes position, and contact between the tool and the part can all greatly affect machine dynamics; thus tuned mass dampers are generally not effective for an overall machine, such as a machine tool.

A method for adding damping at all frequencies is to use a shear plate damper made from alternate layers of viscous and/or viscoelastic and structural materials which are attached to the surface of a machine tool structure. In order to design this type of damping mechanism into a structure, consider that damping can be achieved by friction caused by relative motion, and motion of a structure is generally greatest far from the neutral axis. The greatest degree of damping can therefore be attained by relative motion between two structures whose outer interface surfaces move in opposite relative directions. To accommodate this type of motion and to dissipate large amounts of energy, a viscous or viscoelastic material is needed. The mechanics of materials (e.g., bending of beams) is well understood, and they can be used by those skilled in the art to design shear dampers. The primary problem associated with the use of shear plate dampers in machine tools is a lack of smooth exterior surface space on which to mount them. For machine components such as coordinate measuring machine rams, whose outer surface is used as a bearing surface, shear plate dampers clearly cannot be used. In addition, Components such as boring bars would benefit greatly from increased damping, but external shear dampers would not last in a harsh cutting environment.

An internal damping method for adding damping is addressed in a patent application by Lindsey (UK patent 8,719,169) issued as U.S. Pat. No. 2,194,182. In engineering and architecture, the tetrahedron represents the threedimensional application of the age-old structure of stability, the triangle. Lindsey of NPL in England took these basic building blocks of nature and added well-engineered damping mechanisms to yield the Tetraform machine tool concept. The Tetraform is a machine structure that is in the form of a tetrahedron: Circular tubes for the legs, and spheres form the nodes.

Damping in the cylindrical legs is achieved through the use of a suspended pair of collinear inner concentric cylinders which dissipate energy through viscous shear and squeeze film damping: The inside of the legs is precision bored and honed, while the outside of the damping tubes is precision ground to be a few tens of microns smaller than the inside diameter of the legs. When the outer cylinder undergoes tension or compression, the inner cylinders are not subject to these loads and the relative motion results in viscous shear. When the outer cylinder bends, the inner cylinders act like the chords of a circle, and so fluid is alternatively pumped from between the region between a chord and a positive curvature region to the region between a chord and a negative curvature region. This results in squeeze film damping. The inner two cylinders are concentric with the outer cylinder, so bending will not create relative shear between them.

Damping at the joints is achieved by application of the sliding bearing technology to a structure, the tetrahedron, which wants to retain its shape even when there is slip at the joints. When the tension studs that hold the legs to the joint nodes are properly tightened, the legs of the tetrahedron are structurally decoupled (they essentially behave independent of each other) due to the high degree of damping provided by the sliding bearing interface, yet the bearing interface's finite friction provides enough support so that the legs have a stiffness somewhere between that of a simply supported beam and a beam clamped at both ends. Microslip at the joints does not affect the dimensional stability of the machine because the minimum energy form of the tetrahedron wants to be preserved. Unlike a plane joint which can continue to slip and lead to dimensional instability, the tetrahedron's legs' spherical ends want to stay on the spherical joint nodes.

The principal drawbacks of the Tetraform concept is that it reduces operator access to the work volume, and that the structure's overall size becomes an issue for large work volumes. What is needed is a general purpose damping mechanism that can be applied to virtually any type of structure.

U.S. Pat. No. 4,512,616 by Suzuki and Mizukane attempts to address this need by claiming filling of a structure with a vibration absorbing material (e.g., a viscoelastic material such as rubber). However, this method has actually has been in use literally for centuries, and it does not provide a tenth of the damping that can be obtained with shear damping.

The problem, therefore, is to design 25 shear dampers so that they can fit into the inside of a structure, and to manufacture them in this configuration for low cost.

The solution philosophy is to put a shear plate damper on the inside of the structure; however, to function properly, the shear plate damper requires a smooth surface to adhere to. It is difficult and expensive to form such a surface on the inside of large structures.

The present invention addresses this need for a means to damp vibrations in machines and structures from the inside of the structure. More specifically, the invention is concerned with a system that includes a structure that has longitudinal holes cast, drilled, formed, or attached (in the form of tubes) in it. The holes can be any shape, but the ideal shape maximizes the perimeter (e.g., a square). The holes should be as large as possible and their neutral axes must be as far away as possible from the neutral axis of the structure. Ideally, the holes almost fill the structure (e.g., four squares inside of a large square. A smooth surfaced shear member, such as a tube, that is 3–5 mm smaller than the hole is covered with a very viscous fluid (e.g., vacuum grease). The surface is gently wiped with a rag so only a thin film of viscous mold release is left. Optionally, the ends of the shear members should have lubricated O rings on them to prevent a Newtonian fluid from leaking with time. The shear members are suspended into the holes and an epoxy or hard rubber is injected around the shear member to act as a replicant. After the replicant hardens, a press is used to free the shear member from the replicant. When the procedure has been done properly, the shear members will be held only by viscous friction resistance. Since the neutral axes of the shear members are displaced from the neutral axis of the structure, bending of the structure causes relative shear to occur between the surfaces of the shear members and the structure. This shearing motion shears the viscous fluid and dissipates vibration energy at a rate orders of magnitude higher than would normally occur in the material of the structure or in its joints. This concept allows machine tool builders to design a machine with integral cast longitudinal holes which can have shear members installed if the customer requests a high damping option on the machine order form. Thus the concept facilitates modular construction of machine tools. This design is fundamentally different from earlier shear damper designs (e.g., plates which had a tendency to delaminate) in that the dampers are in the form of replicated-in-place internal shear members, and the energy dissipation mode is primarily due to the shear of a thin film of very viscous fluid and when the replicant is rubber, viscoelastic shearing of the rubber.

OBJECTS OF INVENTION

Accordingly, it is an object of the present invention to provide a new and improved method for damping vibrations in machines, structures, and components, by making the to-be-damped structure have rough holes formed in it, either by casting, drilling, or welding pipe, where the holes can be any shape, but the ideal shape and location maximizes the product of the perimeter of the shape and the distance from the neutral axes to the neutral axis of the structure, so a smooth surfaced shear member, with a diameter 3–5 mm smaller than the hole and a surface finish on the order of 0.5 micron $R_a$, with its surfaced covered with a very viscous fluid, can be inserted into the hole so a replicant, such as epoxy or rubber, can be injected around the shear member, such that when the structure bends, shear strains occur between the structure and the shear members and this strain occurs across the viscous fluid interface which is very thin because of the use of the replicant, so therefore the energy dissipation rate will be high and bending and axial vibrations will be damped.

Another object is to provide a novel damping device that can use the principle of shear damping with a shear member replicated inside the structure, to provide damping for components such as spindle rotors and housings, tool shanks, measuring instrument probes, machine structures and components, space structures, engine components, aircraft components, and any type of component or structure where it is desired to increase damping using a means that is internal to the structure so as to avoid placing damping means on the structure or components exterior which might otherwise limit the functionality of the structure of component.

Still another object of the invention is to provide a means to damp vibrations with the shear of a Newtonian fluid which does not have the hysteresis properties of rubber used in external viscoelastic shear dampers; thereby increasing the accuracy of components, such as precision instrument components, that use dampers.

Still another object of the invention is to provide the theory and easy-to-use spreadsheets for designers to use to design replicated-in-place shear dampers, so the designs will be deterministic: the design engineer will have a high degree of confidence that the design will work as expected.

These and still further objectives are addressed hereinafter are more particularly delineated in the appended claims.

SUMMARY

In summary the invention embraces, a means to damp vibrations in machines and structures from the inside of the structure. More specifically, the invention is concerned with a system that includes a structure that has longitudinal holes cast, drilled, formed, or attached (in the form of shear members) in it. The holes can be any shape, but the ideal shape maximizes the perimeter (e.g., a square). The holes should be as large as possible and their neutral axes must be as far away as possible from the neutral axis of the structure. Ideally, the holes almost fill the structure (e.g., four squares inside of a large square. A smooth surfaced shear member that is 3–5 mm smaller than the hole is covered with a very viscous fluid (e.g., vacuum grease). The surface is gently wiped with a rag so only a thin film of viscous mold release is left. Optionally, the ends of the shear members should have lubricated O rings on them to prevent a Newtonian fluid from leaking with time. The shear member is suspended into the hole, and epoxy or hard rubber is injected around the shear member to act as a replicant. After the replicant hardens, a press is used to free the shear member from the replicant. When the procedure has been done properly, the shear member will be held only by viscous friction resistance. Since the neutral axes of the shear members are displaced from the neutral axis of the structure, bending of the structure causes relative shear to occur between the surfaces of the shear members and the structure. This shearing motion shears the viscous fluid and dissipates vibration energy at a rate orders of magnitude higher than would normally occur in the material of the structure or in its joints. This concept allows machine tool builders to design a machine with integral cast longitudinal holes which can have internal replicated-in-place shear dampers installed if the customer requests a high damping option on the machine order form. Thus the concept facilitates modular construction of machine tools. This design is fundamentally different from earlier external shear damper designs (e.g., plates which had a tendency to delaminate) in that the dampers are in the form of internal shear member, such as tubes, plates, or solid sections, and the energy dissipation mode is primarily due to the shear of a thin film of very viscous fluid, and viscoelastic shear if the replicant is a rubber.

Preferred and best mode designs are hereinafter described.

DRAWINGS

The invention will now be described with reference to the accompanying drawing in which.

THE INVENTION

Figure 1:
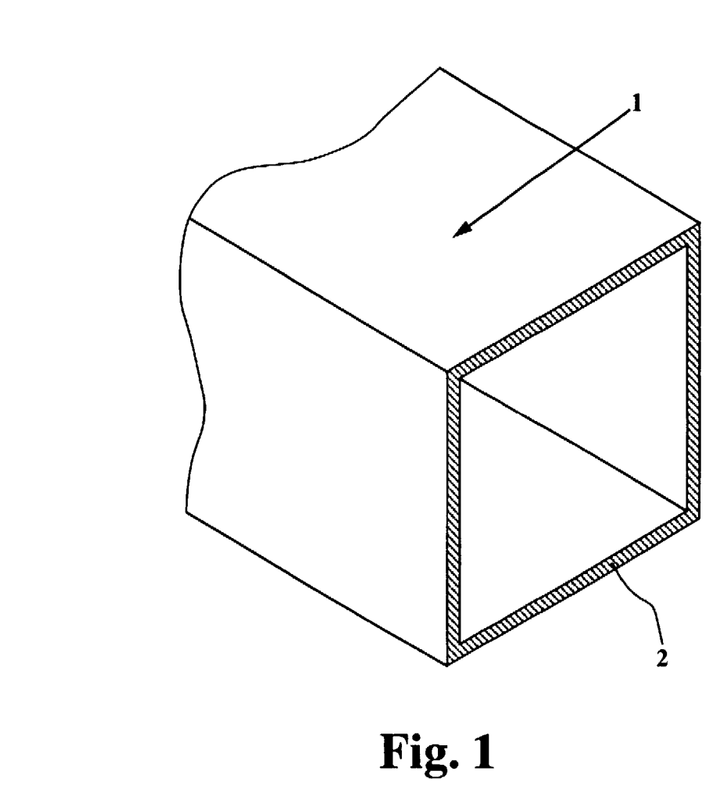
FIG. 1 is an isometric drawing of the end of a simple hollow beam.
Figure 2:
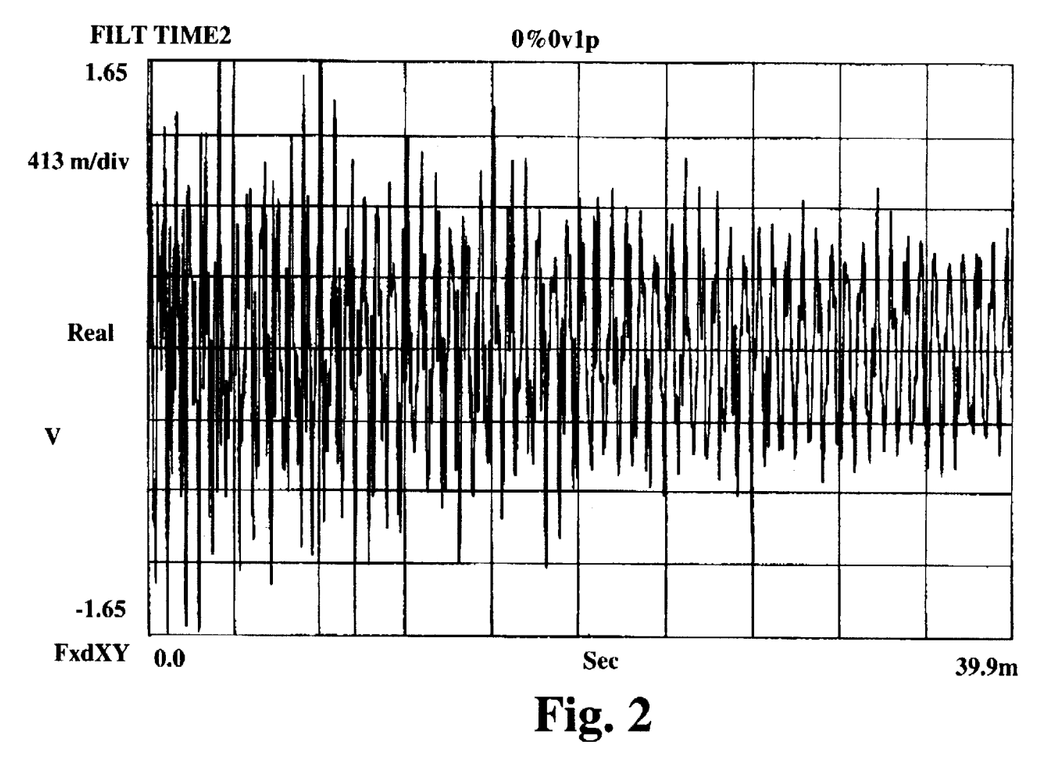
FIG. 2 is the output from a vibration test on a simple hollow aluminum beam 2 inches square with ⅛ inch wall thickness that is 20 inches long.

The drawings illustrate apparatus for attaining a high degree of damping in a machine structure or component. FIG. 1 shows the end of an undamped hollow longitudinally extending metal beam 1 (e.g., a simple hollow aluminum beam 2 inches square with ⅛ inch wall thickness that is 20 inches long) with a center hollow 2 that would typically be used in a coordinate measuring machine as a ram. FIG. 2 shows the response of the beam to an impulse. The figure shows that the oscillations continue for a very long time. By using the method of the logarithmic decrement, it can be shown that the beam has an amplification at resonance on the order of 500. This means that the beam's dynamic stiffness is 1/500th of its static stiffness because there is very little damping present which is required to keep oscillations occurring at resonance from growing larger and larger.

Figure 3:
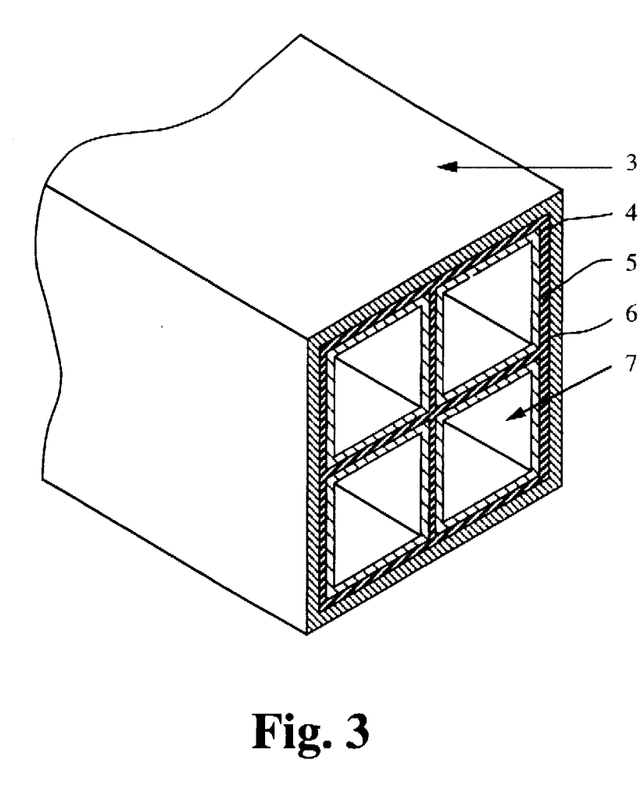
FIG. 3 is an isometric drawing of the end of a simple hollow beam that has ¾ inch aluminum tube shear dampers replicated inside it.
Figure 4:
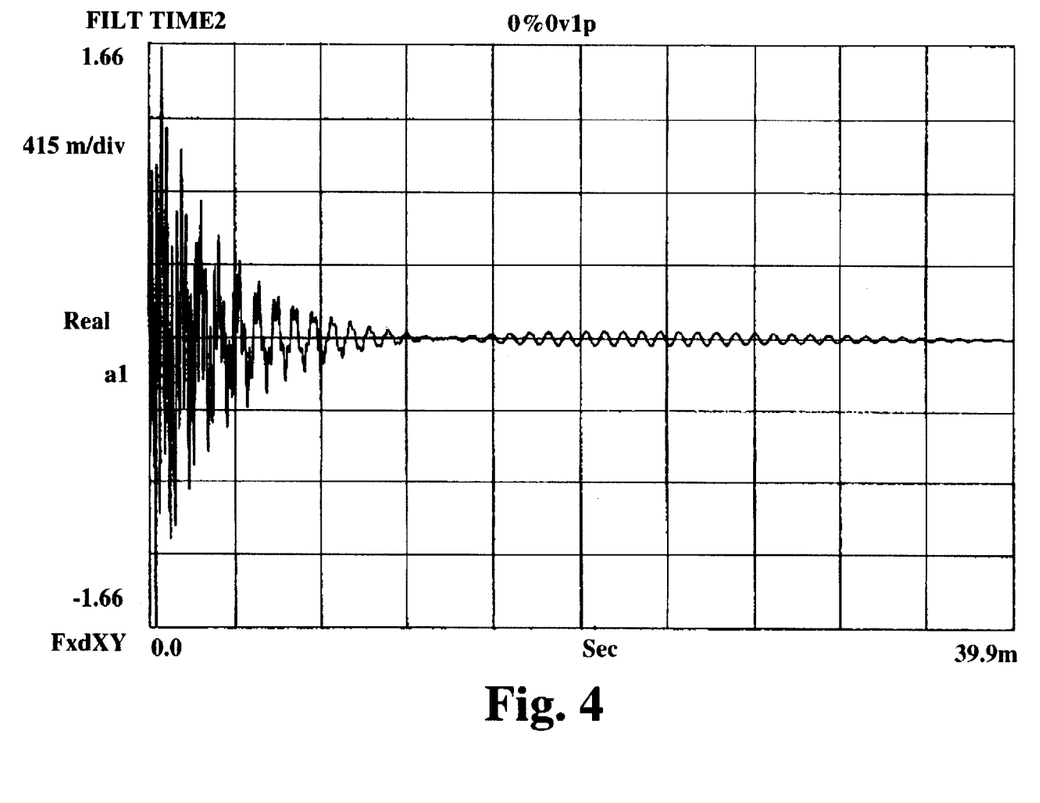
FIG. 4 is the output from a vibration test on a simple hollow aluminum beam 2 inches square with ⅛ inch wall thickness that is 20 inches long that has ¾ inch tubular aluminum shear dampers replicated inside it.

In contrast, FIG. 3 shows the end of hollow aluminum beam 3 that is 2 inches square with ⅛ inch wall thickness that leaves a central hollow 4. This hollow or longitudinal hole 4 has inserted in it internal shear beam members 7, shown here as upper and lower pairs of similar hollow square tubes symmetrically dividing the beam hollow into upper and lower halves about the neutral horizontal transverse axis of the beam; and with the orthogonal vertical neutral axis providing similar left and right symmetry. The internal beam tubes 7 are externally coated with a thin layer, tens of microns, of, for example, viscous fluid 6, preferably, Newtonian, which acts as a mold release so the replicant 5 lining the interior surface of the beam 3 can adhere to the rough surface of the hollow 4 while taking the shape of the smooth surface of the shear members 7 and allow the shear members to slide in an axial longitudinal direction relative to the structural member 3. FIG. 4 shows the response of the beam 3 to an impulse. The figure shows that the oscillations decay quickly because there are shear strains between the outer structural beam 3 and the shear members 7. The shear at the interface between the beams occurs across the viscous fluid 6. By using the method of the logarithmic decrement, it can be shown that the beam has an amplification at resonance on the order of 20 . This means that the beam's dynamic stiffness is only 1/20th of its static stiffness because damping is provided by the shear of the viscous fluid 6 which is required to from growing larger and larger resonance from growing larger and larger.

The amount of damping that can be achieved with the replicated-in-place shear damper can be determined by calculating the amount of work lost to damping and the total work input to the system. The analysis begins by considering the relative motion between beam 3 and the damping members, such as tube 7. If a time varying force F is applied, the beam 3 and the shear members, such as tube 7, must have the same displacement. Thus, $$\delta(x) = \frac{F_b}{6E_b I_b}(-x^3 + 3xL^2 - 2L^3) = \frac{F_t}{6E_t I_t}(-x^3 + 3xL^2 - 2L^3)$$

where the subscripts b and t denote the beam and the shear members respectively. $I_b$ represents the moment of inertia of the beam $E_b$ represents the modulus of elasticity of the beam. The total force F on the composite beam is assumed to be the sum of the forces on the beam plus the n shear members within the structure (n is the number of shear members):

$$F = F_b + \Sigma F_t$$

The forces supported by the beam and each shear member are therefore:

$$F_b = \frac{FE_b I_b}{E_b I_b + \Sigma E_t I_t} \quad F_t = \frac{FE_t I_t}{E_b I_b + \Sigma E_t I_t}$$

The stress in the beam and the damping shear members is found by $\sigma = Fxa/I$, where a is the distance between the neutral axes of the beam and shear member. The resultant strain at this distance a is $\epsilon = \sigma/E$. Over an incremental distance dx on the surface, the change in axial length is $\epsilon dx$. Thus, at any distance x along the beam, the axial displacement is:

$$\int_x^L \frac{\partial \delta_{b,axial}}{\partial x} dx = \delta_{b,axial}(x) =$$

$$\int_x^L \frac{F_b x(a+y)}{E_b I_b} dx = \frac{F_b(a+y)}{2E_b I_b}(L^2 - x^2)$$

The (a+y) term accounts for the axial displacement at any point along the circumference of the hole the shear member is located in. The axial displacement of the shear member can also be found in a similar manner to be:

$$\delta_{t,axial} = \int_x^L \frac{F_t xy}{E_t I_t} dx = \frac{F_t y}{2E_t I_t}(L^2 - x^2)$$

$$\delta_{rel} = \delta_b - \delta_t = (L^2 - x^2)\left\{ \frac{F_b(a+y)}{2E_b I_b} - \frac{F_t y}{2E_t I_t} \right\}$$

$$\delta_{rel} = \frac{Fa(L^2 - x^2)}{2(E_b I_b + \Sigma E_t I_t)}$$

The velocity $v_{rel}$ is $d\delta_{66}/dt$ where $\delta_{66} = \delta_b - \delta_t$. Since the force F is a function of time, the power dissipated along the length of the beam of each damping shear member is:

$$\Delta P = \int_A \tau v_{rel} dA = \frac{p\mu a^2}{4h(E_b I_b + \Sigma E_t I_t)^2} \left(\frac{dF}{dt}\right)^2 \int_0^L (L^2 - x^2)^2 dx$$

-continued $$\Delta P = \frac{2p\mu a^2 L^5}{15h(E_b I_b + \Sigma E_t I_t)^2} \left(\frac{dF}{dt}\right)^2$$

where p is the perimeter of the damping shear member, dx is the length along the beam and h is the thickness of the damping material.

Having determined the dissipated power per shear member, an estimate of the total damping can be made by first calculating the total energy lost per cycle and the energy input per cycle. If the force input is assumed to be sinusoidal (F(t)=A sin ωt), the total energy lost per cycle per shear member can be determined.

$$\Delta U_{cycle} = \frac{8p\mu a^2 L^5 A^2 \omega^2}{15h(E_b I_b + \Sigma E_t I_t)^2} \int_0^{\frac{\pi}{2\omega}} \cos^2 \omega t \, dt = \frac{2\pi p\mu a^2 L^5 A^2 \omega_d}{15h(E_b I_b + \Sigma E_t I_t)^2}$$

The energy input into the damped beam during the cycle is the time integral of the product of the force and velocity:

$$U_{cycle} = 4 \int_0^{\frac{\pi}{2\omega}} \frac{FL^3}{3(E_b I_b + \Sigma E_t I_t) dt} \frac{dF}{dt} dt = \frac{2A^2 L^3}{3(E_b I_b + \Sigma E_t I_t)}$$

The logarithic decrement is found by:

$$\delta_{Ld} = \frac{\Delta U_{cycle}}{2U_{cycle}} = \frac{\pi \mu \omega_d L^2}{10(E_b I_b + \Sigma E_t I_t)} \sum_{i=1}^{n} \frac{a_i^2 p_i}{h_i}$$

where $\omega_d$ is the damped natural frequency of the beam. A typical application is the damping of a cantilever beam. For a cantilever beam, the natural frequency can be found from the general relation:

$$\omega_n = \left(\frac{2n-1}{2}\pi\right)^2 \sqrt{\frac{E_b I_b}{\rho_b A_b L^4}}$$

where n is an integer representing the mode number, A is the cross-sectional area, and P is the density. For the first damped natural frequency of the beam is:

$$\omega_d = 1.875^2 \sqrt{\frac{E_b I_b (1 - \zeta^2)}{\rho_b A_b L^4}}$$

Using this result, the log decrement can be expressed as (for small ζ):

$$\delta_{Ld} = \frac{1.10\mu}{(E_b I_b + \Sigma E_t I_t)} \sqrt{\frac{E_b I_b}{\rho_b A_b}} \sum_{i=1}^{n} \frac{a_i^2 p_i}{h_i}$$

This is a very useful measure of the amount of damping present in the beam system. Knowing the log decrement of the system, the designer may assess the overall damping characteristics of the design.

A spreadsheet that will automatically calculate the logarithmic decrement of a beam with four-holes is:

| ALUMINUM BEAM | |
|---|---|
| diameter of small holes (m) | 0.0093 |
| diameter of large hole (m) | 0.0364 |
| distance of small holes from neutral axis (m) | 0.0191 |
| length of side (m) | 0.0563 |
| length of bar (m) | 0.3048 |
| number of small holes | 4 |
| I of small holes (m^4) | 1.4988E–09 |
| I of offset (parallel axis theorem) (m^4) | 1.0054E–07 |
| I of large hole (m^4) | 8.6639E–08 |
| I of square (m^4) | 8.3795E–07 |
| I total (m^4) | 6.4927E–07 |
| Area of small holes (m^2) | 6.8620E–05 |
| Area of large holes (m^2) | 1.0434E–03 |
| Area of square (m^2) | 3.1710E–03 |
| Area total (m^2) | 1.8531E–03 |
| Poisson's ratio | 0.33 |
| density (kg/m^3) | 2800 |
| modulus of elasticity (N/m^2) | 7.000E+10 |
| shear coefficient | 0.5673 |
| w timo/w euler | 0.8941 |
| free-free natural frequency (Hz) | 3207.31 |
| dynamic viscosity (kg/m-s) | 95.00 |
| viscous fluid thickness (m) | 2.540E–05 |
| damping strip thickness (m) | 3.175E–03 |
| I of damping strip (m^4) | 1.502E–10 |
| Logarithmic decrement | 0.60 |

The spreadsheet will calculate the damping available from an arbitrary geometry, given the moments of inertia and areas of the structure is:

| | |
|---|---|
| distance of tube 1 from neutral axis (m) | 0.0191 |
| distance of tube 2 from neutral axis (m) | 0.0191 |
| distance of tube 3 from neutral axis (m) | 0.0191 |
| distance of tube 4 from neutral axis (m) | 0.0191 |
| length of beam (m) | 0.3048 |
| I of tube 1 (m^4) | 2.5424E–08 |
| I of tube 2 (m^4) | 2.5424E–08 |
| I of tube 3 (m^4) | 2.5424E–08 |
| I of tube 4 (m^4) | 2.5424E–08 |
| I of beam (m^4) | 6.4938E–07 |
| area of tube 1 (m^2) | 6.8661E–05 |
| area of tube 2 (m^2) | 6.8661E–05 |
| area of tube 3 (m^2) | 6.8661E–05 |
| area of tube 4 (m^2) | 6.8661E–05 |
| area of beam (m^2) | 1.8544E–03 |
| density of tubes (kg/m^3) | 2800 |
| density of beam (kg/m^3) | 2800 |
| modulus of elasticity of tubes (N/m^2) | 7.000E+10 |
| modulus of elasticity of beam (N/m^2) | 7.000E+10 |
| perimeter of tube 1 (m) | 2.9374E–02 |
| perimeter of tube 2 (m) | 2.9374E–02 |
| perimeter of tube 3 (m) | 2.9374E–02 |
| perimeter of tube 4 (m) | 2.9374E–02 |
| dynamic viscosity (kg/m-s) | 95.00 |
| viscous fluid thickness (m) | 2.540E–05 |
| Logarithmic decrement | 0.38 |
| Amplification ratio | 8.27 |

These spreadsheets illustrate the deterministic properties of the design which are vitally helpful to the engineer who wishes to apply this technology. In the age of ever increasing costs and shorter design times and product life cycles, deterministic methods are in ever greater demand by designers.

In reapplication, the objectives of the invention are thus attained, generally, in a system to provide a new and improved method for damping vibrations in machines, structures, and components, by making the to-be-damped structure have rough holes formed in it, either by casting, drilling, or welding pipe, where the holes can be any shape, but the ideal shape and location maximizes the product of the perimeter of the shape and the distance from the neutral axes to the neutral axis of the structure, so a smooth surfaced shear member, with a diameter 3–5 mm smaller than the hole and a surface finish on the order of 0.5 micron $R_a$, with its surfaced covered with a very viscous fluid, can be inserted into the hole so a replicant, such as epoxy or rubber, can be injected around the internal shear member between the same and the inner wall of the beam, such that when the structure bends, shear strains occur between the structure and the shear members and this strain occurs across the viscous fluid interface which is very thin because of the use of the replicant, so therefore the energy dissipation rate will be high and bending and axial vibrations will be damped.

Because of the ease of manufacture of the replicated-in-place shear dampers, it is especially suited to implementation in modular form as illustrated in FIGS. 5, 6, 7, and 8.

Figure 5:
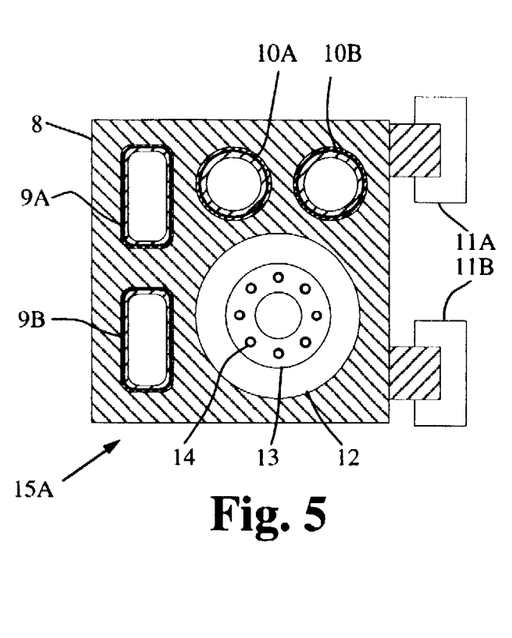
FIG. 5 is a cutaway end view of a machine tool spindle that shows how the replicated-in-place internal shear damper can be employed to reduce vibrations in the spindle rotor and stator.

FIG. 5 is a cutaway end view of an axis 15A for a machine tool spindle 12 mounted in a structural member 8 that is allowed to move in a linear fashion by modular bearings 11A and 11B. The structural member 8 has longitudinal holes cast in it, into which replicated-in-place shear dampers 9A, 9B, 10A, and 10B are manufactured by the process described above. Note here that the replicated-in-place upper and lower shear dampers 9A and 9B have a rectangular cross section, and dampers 10A and 10B have a round cross section. As the previously described theory shows, any convenient cross section member can be used as the shear member. The spindle 12 is typically of a modular cartridge type. Here, the rotor 13 has in it replicated-in-place shear dampers 14.

Figure 6:
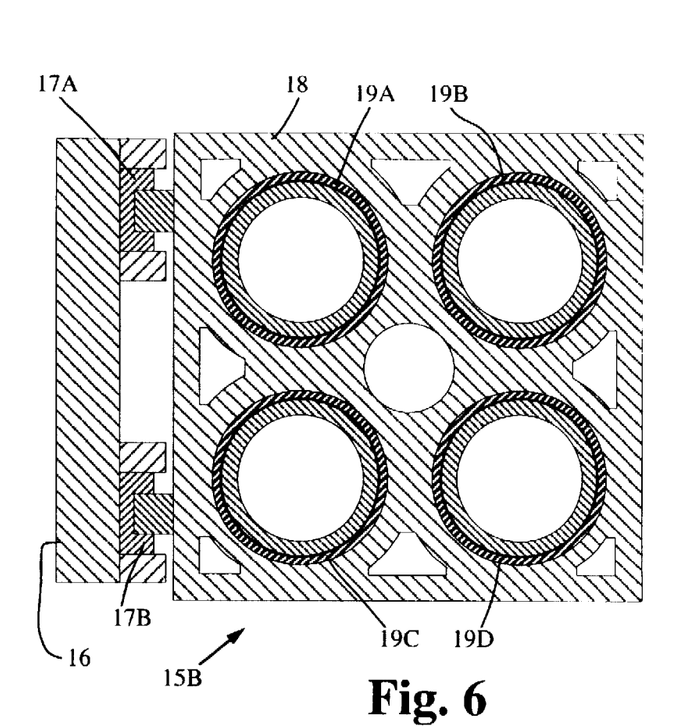
FIG. 6 is a cutaway end view of a machine tool column that shows how the replicated-in-place internal shear damper can be employed to reduce vibrations in the machine structure.

FIG. 6 is a cutaway end view of an axis 15B for a machine tool, which may be used, for example, to hold the spindle axis 15A. Bearings 11A and 11B in FIG. 5 would attach to the plate 16 which moves relative the column 18 on modular linear bearings 17A and 17B. The column is damped by replicated-in-place upper shear dampers 19A, 19B, and lower shear damper 19C, and 19D. This design allows a machine tool design engineer to design a structure with damping as high as one could obtain with epoxy granite structures (e.g., Granitan™), yet allows the designer the freedom to make the structure out of any material he or she wants. For example, many designers prefer cast iron because of its better heat transfer properties and its proven exceptional stability over long periods of time. Other materials that the designer may want to use include ceramics such as aluminum oxide which are being used extensively for coordinate measuring machines.

Figure 7:
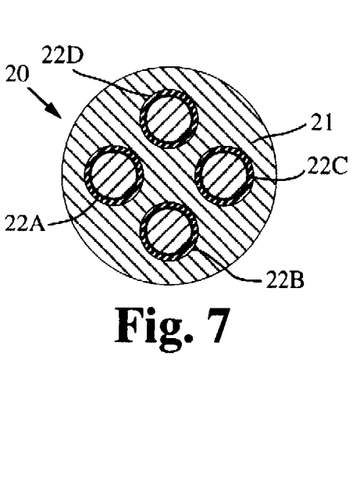
FIG. 7 is a cutaway end view of a tool shank that shows how the replicated shear damper can be employed to reduce vibrations.

FIG. 7 shows a cross sectional view of the shank of a process tool 20 such as a boring bar. These shanks are typically round, and could have holes in the shank 21 for the replicated-in-place round shear dampers 22A, 22B (bottom), 22C, and 22D (top) either drilled or formed during an extrusion process.

Figure 8:
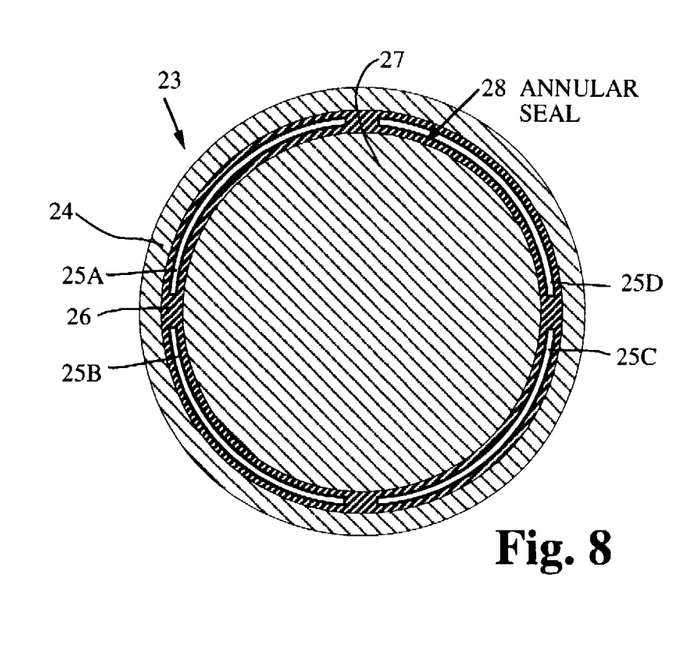
FIG. 8 is a cutaway end view of a tubular space structure member with integral replicated shear damping members.

FIG. 8 shows a cross sectional view of a tubular structural member 23 such as the tube for a space structure or a bicycle. The structural tube 24 has thin arc-shaped replicated-in-place shear dampers 25A, 25B, 25C, and 25D inside it and above and below the neutral horizontal diametric axis of the tubular member 23. The replicant 26 covers both sides of the arc-shaped replicated-in-place shear dampers 25A, 25B, 25C, and 25D. The inside surface of the replicant is bounded by a material 27 such as an open cell foam, which may have its outer surface sealed, for example by a thin plastic sheet 28. After the replicant cures, the open cell foam may be left in-place for greater crush resistance for the tube 24. If the center of the tube 24 is to be hollow, for maximum weight reduction, the inner surface of the replicant 26 could be bounded by a removable mandrel. After the replicant cured, the mandrel could be extracted.

Further modifications of the invention will also occur to persons skilled in the art, and all such are deemed to fall within the spirit and scope of the invention as defined by the appended claims.

What is claimed is:

1. A structural load supporting system having, in combination, one or more structural members each having a neutral axis and having internal holes formed therein and therealong and of perimeter shape and location relative to the neutral axis of the member so as to maximize the product of the perimeter of the shape and the distance of the hole from said neutral axis of the member; shear members having a thin viscous layer, of said one shear members for insertion in each of said hole and of cross-section just slightly smaller than the hole; and a replicant secured internally of the structural member and around the viscous-layered shear members and bounding the holes to suspend the shear members in the holes by only the viscous layer frictionally contacting the hole-bounding replicant; such that when the structural members bend, shear strains occur between the structural members and the shear members across the thin viscous layer to provide high dissipation and damping of bending and axial vibrations of the structural members.

2. A damped apparatus having at least one structural member, said structural member comprising:
   a. a longitudinally extending body portion having a long axis and at least one elongate hollow;
   b. inside said hollow and spaced away from said body portion, at least one elongate shear member, aligned parallel to the long axis of said hollow and so that an annular space is defined between said body portion and said shear member;
   c. said at least one shear member coated with a highly viscous thin layer; and
   d. in said annular space between said body portion and said coated shear member, a hardened replicant is substantially fixed only to the body portion.

3. The damped apparatus of claim 2, wherein said elongate hollow comprises a hollow cast into said body portion.

4. The damped apparatus of claim 2, wherein said elongate hollow is defined through said body portion by drilling.

5. The apparatus of claim 2, wherein said annular space between said body portion and said shear member has a thickness of less than five millimeters.

6. The apparatus of claim 2, wherein said shear member has a surface finish on the order of 0.5 microns $R_a$.

7. The apparatus of claim 2, wherein said replicant comprises epoxy.

8. The apparatus of claim 2, wherein said replicant further comprises rubber.

9. The apparatus of claim 2, wherein said viscous layer further comprises a Newtonian fluid.

10. The apparatus of claim 2, further comprising an annular seal between the body portion and the shear member at at least one end of the at least one shear member.

11. The apparatus of claim 2, wherein the location of the neutral axis of said shear member is spaced away from the location of the neutral axis of the structural member.

12. The apparatus of claim 2, wherein said at least one elongate hollow is arranged generally with its long axis oriented vertically.

13. The apparatus of claim 2, wherein said at least one elongate hollow is arranged generally with its long axis oriented horizontally.

14. The apparatus of claim 2, wherein said at least one elongate shear member is surrounded around its cross-section by said replicant.

15. The apparatus of claim 2, wherein said at least one elongate shear member further comprises an arc-shaped cross-section.

16. The apparatus of claim 2, wherein said body portion is tubular.

17. The apparatus of claim 2, wherein said apparatus is a process tool.

18. The apparatus of claim 17, wherein said process tool comprises a boring bar.

19. The apparatus of claim 17, wherein said process tool comprises an end mill.

20. The apparatus of claim 17, wherein said process tool comprises a shell mill.

21. The apparatus of claim 17, wherein said process tool comprises a grinding wheel.

22. The apparatus of claim 2, wherein said apparatus comprises a measuring instrument.

23. The apparatus of claim 22, wherein said measuring instrument further comprises:
   a. a contact probe portion and;
   b. a measurement system; and
wherein said structural member is a shank connecting said contact probe to said measurement system.

24. The apparatus of claim 2, wherein said body portion comprises cast iron.

25. The apparatus of claim 2, wherein said body portion comprises a ceramic.

26. A space frame apparatus made of at least one tubular member, said tubular member having at least one elongate hollow, said apparatus comprising:

a. inside said hollow and spaced away from said tubular member, at least one elongate shear member, aligned parallel to the long axis of said hollow so that an annular space is defined between said tubular member and said shear member;

b. said at least one shear member coated with a thin highly viscous fluid layer; and c. disposed in said annular space between said tubular member and said layer-coated shear member is a hardened replicant that is fixed relative only to the tubular member.

27. The space frame apparatus of claim 26, wherein said apparatus is a bicycle frame.

28. The space frame apparatus of claim 26, wherein said apparatus is a space station.

29. A structural load supporting system having, in combination, a longitudinally extending structural beam containing a longitudinally extending internal hole and having a neutral transverse axis longitudinally dividing the beam into portions on opposite sides of said transverse axis; the internal hole being bounded by a hardened replicant filler disposed internally along the structural beam; and a longitudinally extending internal shear member inserted within and extending along the hole and coated with a thin viscous layer suspending the internal shear member within the hole and in viscous friction resistance contact with the replicant filler bounding the hole, in order to provide for longitudinal shearing action and damping dissipation in response to vibration of the beam.

30. The system as claimed in claim 29, in which the hole substantially occupies the area of cross-section of the beam.

31. The system as claimed in claim 30, in which the hole almost fills the beam's cross-section.

32. The system as claimed in claim 30, in which the hole with the inserted internal shear member comprises a plurality of hole-internal beam combinations symmetrically disposed in the structural beam portions on opposite sides of said transverse axis.

33. The system as claimed in claim 32, in which the structural beam also has a neutral axis orthogonal to the transverse axis, and the hole-internal beam combinations are symmetrically disposed in structural beam portions on opposite sides of the orthogonal axis.

* * * * *